July 15, 1969  A. J. COURTIER  3,455,797
PROCEDURE FOR THE PREPARATION OF OLEFIN OXIDES
Filed April 26, 1966  2 Sheets-Sheet 1

INVENTOR.
ARMAND JEAN COURTIER
BY
McDougall, Hersh, Scott & Ladd
ATTYS.

July 15, 1969    A. J. COURTIER    3,455,797
PROCEDURE FOR THE PREPARATION OF OLEFIN OXIDES
Filed April 26, 1966    2 Sheets-Sheet 2

INVENTOR.
ARMAND JEAN COURTIER
BY
McDougall, Hersh, Scott & Ladd
ATTYS.

United States Patent Office
3,455,797
Patented July 15, 1969

3,455,797
PROCEDURE FOR THE PREPARATION OF OLEFIN OXIDES
Armand Jean Courtier, Meudon, France, assignor to Produits Chimiques Pechiney-Saint-Gobain, Neuilly-sur-Seine, France
Filed Apr. 26, 1966, Ser. No. 545,454
Claims priority, application France, Apr. 27, 1965, 14,835
Int. Cl. C07d *1/02;* B01k *3/00*
U.S. Cl. 204—80                                    19 Claims

ABSTRACT OF THE DISCLOSURE

Manufacture of olefin oxides of resins having from 2 to 4 carbon atoms in which the olefin is dissolved in an aqueous solution of an alkali metal chloride and contacted with chlorine while the solution is maintained at a pH below 7 to produce the corresponding monochlorohydrin, introducing a base to adjust the pH to above 7 and then removing hydrogen chloride from the monochlorohydrin to produce the olefin oxide.

---

This invention relates to the preparation of olefin oxides.

Oxides of short chain olefins have been prepared in accordance with the known procedures of the prior art by preparation of chlorohydrins from which hydrogen chloride is split off to produce the corresponding olefin oxide. In the preparation of the chlorohydrin, use is made of chlorine, water and the olefin in which it is desirable to avoid contact between the gaseous chlorine and the olefin, otherwise the olefin chloride would form directly, with a corresponding decrease in the yield of chlorohydrin. To avoid this handicap, the chlorine gas is dispersed for flow through the water to facilitiate solution of the chlorine in water. Use is made of a suitable dispersing system to reduce the chlorine gas into fine bubbles for rapid solution in the water which gives rise to HCl and HClO, based upon the following hydrolysis reaction:

$$Cl_2 + H_2O \rightleftharpoons HCl + HClO$$

That free chlorine and/or HClO is present in the solution can be ascertained, e.g. in the manner that iodine is liberated from a solution of potassium chloride. The solution of HClO is thereafter subjected to the reaction of gaseous olefin—the short chain olefins are usually in the gaseous state. The olefin is easily absorbed in the aqueous HClO solution, yet the yield of monochlorohydrin is relatively low by reason of the formation of an olefin dichloride as a byproduct. Thus the prior art procedures leave much to be desired.

It is an object of this invention to increase the yield of monochlorohydrin with corresponding increase in the yield of olefin oxide and it is a related object of this invention to achieve the increase in yield in a manner which avoids the problems heretofore described in the prior art procedures.

An important concept of this invention resides in starting with an aqueous saline solution of the lower olefin to produce the corresponding chlorohydrin from which hydrogen chloride can be easily removed to produce the olefin oxides.

Another important concept of this invention resides in the selective preparation of the monochlorohydrins by the use of an aqueous saline solution of the lower olefin which, by comparison with the solution used in the known processes, does not contain chlorine either in the free or labile state. As used herein, the term "free or labile" chlorine is meant to identify any kind of $Cl_2$ which liberates $I_2$ from a potassium iodine solution or which could liberate $I_2$ as soon as $Cl_2$ is brought into contact with the potassium iodine solution.

In general, the precedure of this invention comprises the following steps:

(1) The olefin, having from 2 to 4 carbon atoms, is dissolved in an aqueous solution of an alkali metal chloride;

(2) Chlorine is passed into contact with the weak olefin solution, in which the chlorine is derived from electrolysis of an aqueous solution of the same alkali metal chloride; in this way, the monochlorohydrin of the corresponding olefin is produced;

(3) HCl is then split off of the monochlorohydrin to produce the olefin oxide as one product and a residual liquor as another product which is cycled to the electrolysis system.

Thus, the procedure of this invention consists of three individual steps, each of which serves a distinct purpose, namely: (1) dissolving the olefin and contacting the dissolved olefin with $Cl_2$; (2) splitting HCl from the monochlorohydrin that is formed; and (3) electrolysis of the residual liquor from the second step.

It is important for the olefin to be dissolved in the aqueous salt solution. Under these conditions, almost all of the olefin is converted into the corresponding monochlorohydrin by the reaction with chlorine and only a small amount, such as a few percent, of olefin dichloride will be formed. In the processes previously employed in which the olefin is present as a dispersion in an aqueous medium, the amount of undesirable olefin dichloride that is formed will usually exceed 10%.

In accordance with one embodiment of this invention, the olefin is dissolved in a solution of sodium and/or potassium chloride under a pressure within the range of .5 to 40 bars and preferably 1.5 to 10 bars. The salts are present in the solution or brine in an amount within the range of 8–30% by weight and preferably 12–25% by weight.

The chlorine is introduced for combination with the olefin at a temperature below 80° C. and preferably at a temperature within the range of 15–25° C.

An important feature of the invention resides also in the supply of chlorine in the amount calculated theoretically to react with the olefin in solution and preferably in an amount within the range of theory to about 5% less than theory and in which olefin is present in the alkali metal chloride salt solution in an amount to provide a saturated solution.

Formation of the monochlorohydrin is accompanied by the formation of an equivalent amount of HCl. The HCl can be allowed to remain but it is preferred to neutralize the HCl upon formation, in whole or in part, to minimize corrosive attack on the apparatus and equipment. This can be accomplished by addition of a basic solution in an amount to neutralize the acid and maintain the pH to below 7 and preferably within the range of 4 to 6.

Another feature resides in the maintenance of the monochlorohydrin that is formed in the salt solution to a concentration below 1 mole per liter and with the concentration preferably being considerably lower in the case of propylene and butylenes. Advantage is derived when the concentration is maintained even below .2 mole per liter. At concentrations above 1 mole per liter, separation of monochlorohydrins will occur with the formation of correspondingly larger amounts of the dichlorides. Once the liquor has reached the desired concentration of monochlorohydrin, all or part of the brine is cycled in a continuous or discontinuous operation to an extraction zone where hydrogen chloride is split off to form the corresponding epoxide. Removal of HCl from the monochlorohydrin is carried out in a separate zone in which the solution of monochlorohydrin is raised to boiling point temperature to form the crude olefin oxide and rectification of the crude olefin oxide to produce a purified olefin oxide is achieved in a subsequent purification zone. Before treatment to split off the hydrogen chloride, the monochlorohydrin solution is treated with an aqueous salt solution in the form of a brine which is basic in character, preferably a solution of sodium hydroxide and/or potassium hydroxide in brine which is withdrawn from the cathode container of the electrolytic cell. Use is made of a base, represented by a solution of potassium hydroxide or sodium hydroxide, in an amount within the range of 40 to 120 grams per liter whereby the brine solution of mono-chlorohydrin, after being brought to boiling point temperature for splitting off HCl, leaves a distillation residue having a pH of more than 7 and preferably within the range of 8 to 9. Such liquid residue, which has a boiling point above 100° C., is neutralized to a pH of about 7 after introduction into the electrolytic cell.

In accordance with the practice of this invention, the residual liquid, enriched with NaCl and/or KCl by reason of the joinder with the split off HCl, is introduced into the electrolytic cell. The electrolytic cell can be formed of any known electrolytic system in which separation can be maintained between the $Cl_2$ and the alkali metal base. Use can be made of a system which employs a diaphragm or a system embodying a mercury cell (cathode) or other known system. The temperature of the briny liquid can be reduced by the use of a suitable heat exchanger to maintain the brine at a temperature for optimum electrolytic yield of the briny liquor. The optimum temperature level may vary depending somewhat upon the electrolytic system but, for the most part, the optimum temperature will be within the range of 60–90° C.

The yield will also depend somewhat on the concentration of salt in the liquor for smoothest operation. For example, with a solution of NaCl, the resistivity changes from 11 ohms/cm./cm.$^2$ to 6 ohms/cm.Cm.$^2$ at 20° C. with the change in salt concentration from 5% to 14% by weight. A change in the salt concentration from 14% to 18% by weight will change the resistivity from 6 to 5.25 ohms/cm./cm.$^2$. A change in salt concentration from 18% up to 22% by weight will further change the resistivity from only 5.25 to 5 ohms./cm./cm$^2$. A further change in salt concentration from 22% up to 26% by weight will result in a drop in resistivity of only .1 ohms/cm./cm.$^2$.

From the practical standpoint, it is advantageous to electrolyze a liquor in which the salt concentration is about 25% by weight, since higher concentrations will not offer any inducement. The electrolysis of the alkali metal chloride results in the production of $Cl_2$ at the anode for use in the formation of the monochlorohydrin. Hydrogen is obtained as a byproduct of the electrolysis. The brine in the anode compartment is utilized in the exploitation of the invention. Solution saturated with the salt should not be employed since the olefin would be incapable of solution therein. Best results are secured with a solution containing 15–25% by weight of the salt and preferably with the salt present in an amount within the range of 18–22% by weight from the standpoint of both the electrolysis as well as the solution of the olefin therein.

The liquor in the cathode compartment contains the alkali metal hydroxide in solution which can be used for pH adjustment of the reaction medium in the zone for splitting off HCl and/or for adjusting the pH of the monochlorohydrin solution to a value above 7 and preferably in a range of 8 to 9 before it is introduced into the zone for splitting off HCl.

The invention, which includes the means as well as the procedure for the manufacture of olefin oxides, will hereinafter be described by way of illustration, but not by way of limitation, in which—

Figure 1:
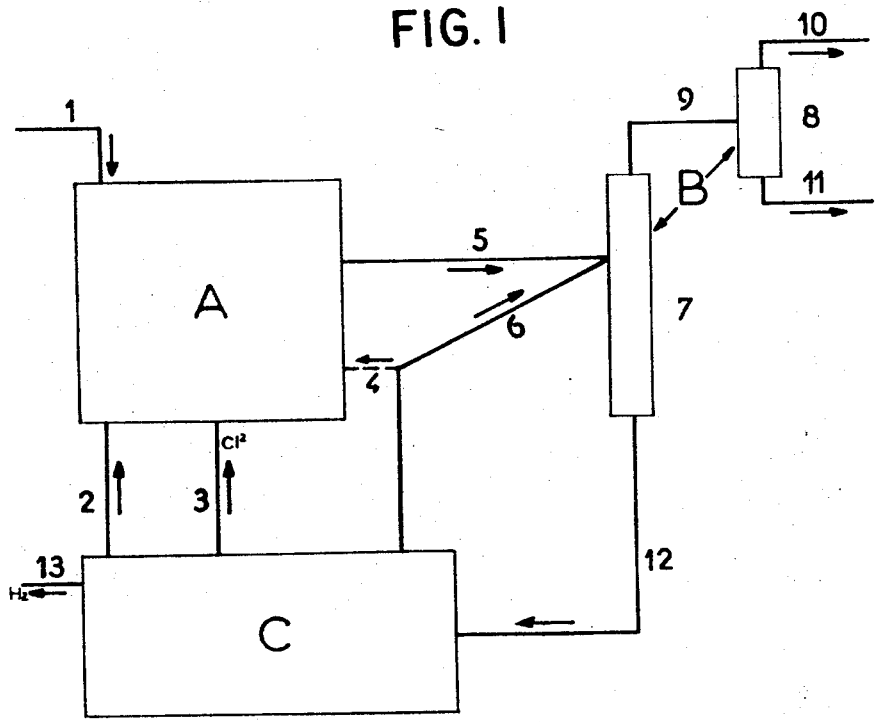
FIG. 1 is a schematic flow diagram for the production of olefin oxides in accordance with the practice of this invention.

In FIG. 1, the setup is essentially as follows: A designates a vat for the manufacture of monochlorohydrin; B represents the rectification devices for a removal of hydrogen chloride and for the purification of the olefin oxide that is formed; and C represents the electrolytic cell for the electrolysis of sodium chloride and/or potassium chloride.

The olefin is introduced into the vat A via line 1 and the aqueous solution of the salt is introduced through line 2 and the gaseous $Cl_2$ through line 3. A portion, as required, of the alkaline liquor is fed from the cathode compartment of the cell C into the vat A through line 4. The solution of monochlorohydrin, which is acidic or almost neutral, depending upon whether or not NaOH or KOH is added during the process through line 4, flows from vat A to the apparatus B through line 5. At the same time, NaOH or KOH solution is introduced into column B from the electrolytic cell C through line 6. As illustrated, the apparatus B comprises a pair of distillation columns 7 and 8.

In the distillation column 7, the vapors of olefin oxide and the rather small amount of entrained olefin dichloride passes through line 9 into the second column 8 from which purified olefin oxide is withdrawn from the top through line 10 while the dichlorides are drawn off at the bottom through line 11. The brine remaining in column 7 is drawn off through line 12 for return to the electrolytic cell.

The electrolytic cell produces both $Cl_2$ necessary for the production of the monochlorohydrin as well as the anodic brine, which is somewhat impoverished with respect to salt and which flows through line 2 into the vat A. Hydrogen is drawn off through line 13. This hydrogen is pure and thus may be employed in such applications as reduction reactions, synthesis of organic or inorganic products, and in fuel cells which may furnish a rather large portion of the energy required in the electrolysis.

Use can be made of pure olefins, in which event only one vat would be required for dissolving the olefin in the brine. If use is made of olefins which contain saturated hydrocarbons, as is often the case, then it is preferred to make use of a battery of vats operating in countercurrent flow for solution of the olefin in the brine.

The following examples are given by way of illustration of the invention, but not by way of limitation:

Example 1

This example is intended to show the advantage in having the $Cl_2$ react on the brine solution of olefins rather than upon an aqueous salt solution containing $Cl_2$.

Figure 2:
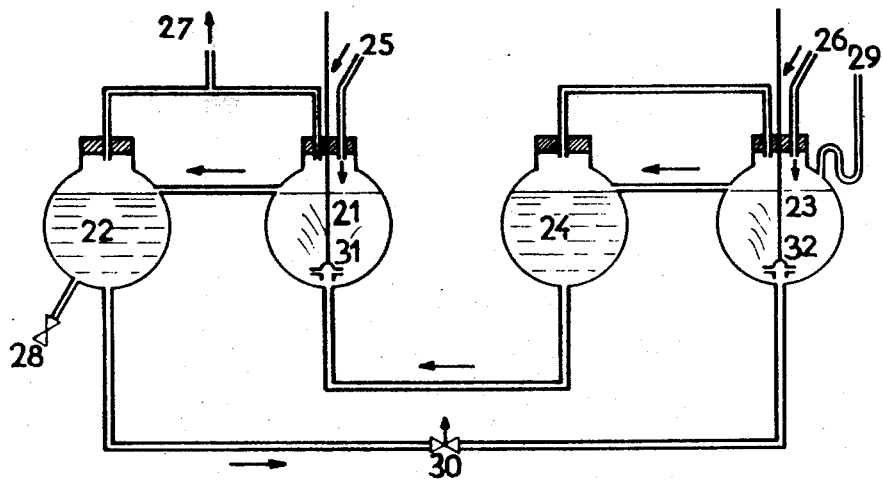
FIG. 2 is a diagram of the apparatus used in the process of Example 1.

In the glass laboratory apparatus schematically illustrated in FIG. 2, the numerals 21, 22, 23 and 24 represent flasks of 2 liters capacity which are interconnected in the manner illustrated in FIG. 2. The olefin, which is a mixture of 1-butene and 2-butene, is introduced through tubing 25 into the container 21 equipped with an agitator 31. The gaseous $Cl_2$ is introduced through tubing 26 into the flask 23 which is also equipped with an agitator 32. The apparatus is filled with an aqueous solution containing 8% by weight NaCl. The butenes are introduced through line 25 into the container 21 and the pure $Cl_2$ is introduced through line 26 into the container 23 and the spent gases are evacuated through line 27. Samples are removed from container 24 and from container 22 by way of tubings which have not been shown in the drawings. Samples from the liquor are taken from the container 24 to determine the amount of free $Cl_2$ and from the container 22 to determine the amount of monochlorohydrins produced. When the desired concentration of chlorohydrin in flask 22 has been reached (0.42 M), the brine is fed through tubing 29 and the aqueous solution of monochlorohydrin is collected through the tubing 28.

In a first experiment, the brine in container 24 is maintained free of $Cl_2$ coming from container 23. 228 liters of the butenes is dissolved in the container 21 and is thereafter admitted to the container 23 across the stopcock 30 with interposition of the container 22. 38 liters of solution is collected containing 9.1 moles of monochlorohydrin which corresponds to a mole yield of 96%.

In a second experiment, an amount of free chlorine from container 23, corresponding to 24 mg. per liter is maintained in the solution in the container 24.

Water containing $Cl_2$, NaCl and HCl is introduced into the container 21. This simply means that one lets dissolved $Cl_2$ react with the butenes. The amount of butenes absorbed by the solution over the same period of time as that used in the first experiment was 248 liters. 34 liters of monochlorohydrin solution was obtained containing 6 moles of monochlorohydrin. This corresponds to a molar yield of 58% calculated on the base of the absorbed butenes.

It will be noticed that the yield in the second experiment, representative of prior art procedures, is much lower than the yield obtained in the first experiment, which is representative of the procedure of this invention.

Example 2.—Preparation of ethylene oxide

In an arrangement similar to that of FIG. 1, the vat A is filled with a solution of 20% by weight NaCl in water. The operating conditions are arrived at by the addition of ethylene until the assay of the solution is 0.5 M with respect to monochlorohydrin. Thereafter the operation proceeds at a constant or continuous pace.

Through line 2, 240 liters per hour of brine containing 19% NaCl is circulated from the anode compartment C to the vat A. A solution of NaOH is circulated through line 4 from the cathode compartment of the electrolytic cell, the amount of which is regulated so that the pH of the vat A will be maintained between 4.5 and 5. This is accomplished by the introduction of 60 liters of alkaline brine per hour. The output of $Cl_2$ transmitted from the electrolytic cell to the vat A, through line 3, amounts to 3.8 m.$^3$ per hour whereas the feed of ethylene to vat A through line 1 is about 4 m.$^3$ per hour.

The brine containing glycol monochlorohydrin is fed from the vat A across line 5 into the midsection of the column 7 at a rate of 300 liters per hour. The column 7 is filled with Raschig rings. Simultaneously, 60 liters per hour of an alkaline brine is circulated from the cathode compartment of the electrolytic cell through line 6 for introduction into the column 7 at the same point of introduction of the monochlorohydrin. The regulation of the output of this salty NaOH solution is maintained so that the brine is recovered at the bottom of column 7 at a pH within the range of 8 to 9. The base of this column is heated to a temperature of 106° C. The effluent from the top of column 7 is mainly vapors of ethylene oxide which are passed for rectification to column 8. 6.7 kg. ethylene oxide per hour are recovered from line 10 while .85 kg. per hour of dichloroethane are discharged through line 11.

The brine, issuing from the bottom of column 7, having a concentration close to 25% by weight, is adjusted to a pH of about 7 by the addition of HCl and is passed through line 12 to the electrolytic cell of the diaphragm type and in an amount so that the level of liquid is maintained at about the same height in the cathode and in the anode compartments.

After 24 hours of continuous operation, the following balance was established: 112 kg. of ethylene of 99.5% purity were consumed; 275 kg. of $Cl_2$ were consumed; 161 kg. ethylene oxide were produced; 20.4 kg. dichloroethane were obtained; 4.4 kg. of purging gas were used to eliminate impurities, and 660 kwh. of electricity were consumed in the electrolysis.

Under these conditions, the molar yield of ethylene oxide is 91%, expressed on the basis of the amount of ethylene supplied. In addition, there is obtained 5.1% dichloroethane and 3.9% purging gas.

Example 3.—Production of propylene oxide

Figure 3:
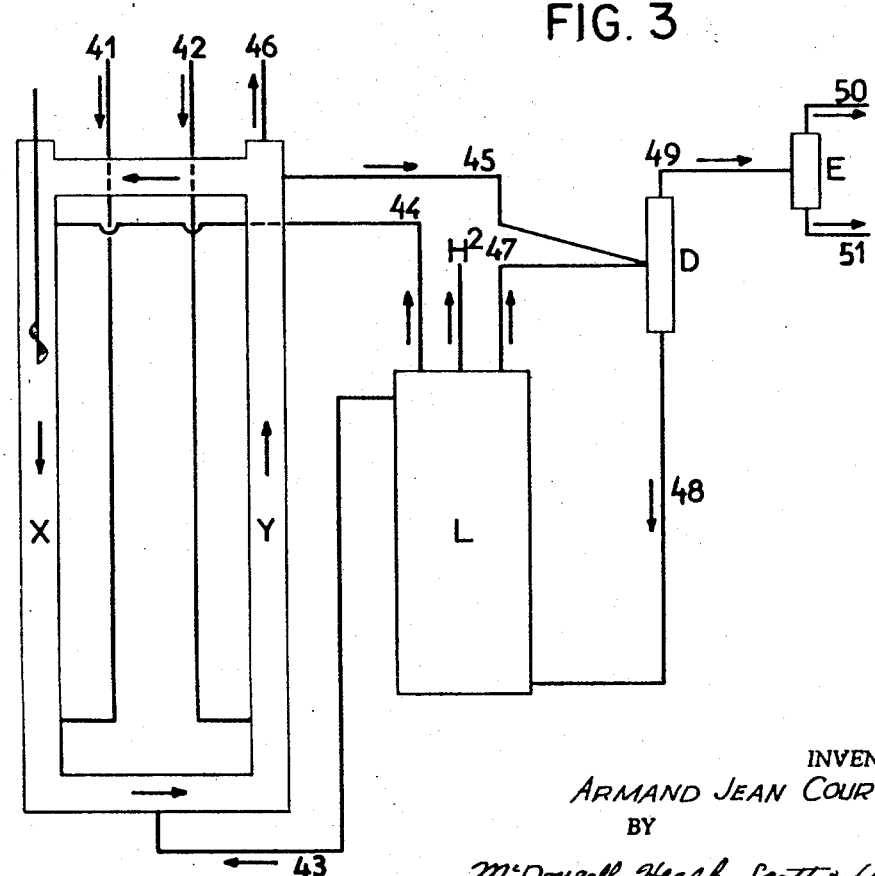
FIG. 3 is a diagram of the apparatus used in the process of Examples 4, 5 and 3.

The apparatus used is that shown in FIG. 3.

XY is a tube of U-shape filled with NaCl solution containing 19% by weight NaCl. Circulation is brought about by suitable means in the direction indicated by the arrows.

2.1 m.$^3$ of propylene per hour are supplied through lines 41 and 42 to the lower portions of the U-tube. The chlorine gas is fed through line 43 at a rate of 2 m.$^3$ per hour and the brine is fed through conduit 44 at a rate to maintain a constant level in the tube XY. The chlorohydrin produced in this tube is fed through line 45 to the rectifier column D filled with Raschig rings which also receives the cathode liquor fed through line 47 at a rate of 68 liters per hour. The vapors of propylene oxide, leaving column D through line 49, are rectified in column E. Approximately 4.3 kg. propylene oxide per hour are recovered from line 50 and .22 kg. dichloropropane per hour is discharged through line 51. The brine, from which the propylene oxide has beeen stripped, is recycled to the electrolytic cell L through line 48.

The diaphragm type cell furnishes the $Cl_2$ which is passed through line 43 to the bottom of the tube XY and the anodic brine solution is passed through line 44 into the upper third of tube XY.

This is a continuous operation. The solution of monochlorohydrin, which is contained in the tube XY, is maintained at a concentration of 0.5 M. It pours out across the overflow 45 at a rate of 170 liters per hour. About 0.1 m.$^3$ of propylene gas containing 50% by weight of impurities mostly in the form of saturated hydrocarbons which do not react are blown off per hour through line 46.

During 24 hours of continuous operation, 46.6 m.$^3$ of crude propylene gas, containing 97.3% by weight of propylene are consumed. 104 kg. propylene oxide are obtained, corresponding to a yield of 92% by weight calculated on the basis of the weight of the crude propylene. 5.7 kg. of dichloride are also obtained as a byproduct, corresponding to a conversion of 2.6% of the crude propylene into this compound. The 5.4% required to make up the 100% is the amount of propylene which is blown off as a purging gas containing all of the impurities, the bulk of which is propane.

The electrical energy consumed for the manufacture of the $Cl_2$ by electrolysis amounts to 33.5 kwh.

Example 4.—Production of butylene oxides

The same apparatus is used as was used in Example 3. The operation is essentially the same with the exception that the monochlorohydrins are less soluble in the brines and form an upper layer in the XY tube from which they are withdrawn by decantation.

The raw material is a mixture of 1-butene and isobutene which boils between —5° and —6° C. at atmospheric pressure. The amount of butenes absorbed is about 900 liters per hour and 2.5 kg. of oxide per hour are produced. In 11 hours of continuous operation, 9900 liters of butene have been used up of which 198 liters, or 2% by volume, is blown off as purging gas. 27 kg. butene oxides are obtained which corresponds to a yield of 93% by weight. The amount of chlorinated residues was less than 5 mole percent. The butene oxides distilled between 50° and 61° C. under atmospheric pressure.

Example 5

The procedure was the same as in Example 4 but a portion of the upper layer, containing the monochlorohydrins, is withdrawn as it becomes decanted. This portion is passed through line 45 into a special decanting unit, not shown in FIG. 3. $C_6H_6$ is added to facilitate decantation. Distillation of the $C_6H_6$ solution yields butene monochlorohydrins in a purified state. The remainder of the operations, pertinent to the preparation of butene oxides, are otherwise the same as outlined in Example 4.

It will be apparent from the foregoing that I have provided a new improved and more efficient means for the production of olefin oxides in a continuous or batch operation from raw materials of the types which have heretofore been employed.

It will be understood that changes may be made in the details of formulation and apparatus as well as the conditions of operation without departing from the spirit of the invention, especially as defined in the following claims.

I claim:

1. In the method for the manufacture of olefin oxides in which the olefin has from 2 to 4 carbon atoms, the steps of dissolving the olefin in an aqueous solution of an alkali metal chloride, contacting the solution of the olefin with chlorine while maintaining the pH of the solution below 7 to produce the corresponding monochlorohydrin in the brine, introducing a base into the aqueous solution of the monochlorohydrin to adjust the pH to above 7 and removing hydrogen chloride from the monochlorohydrin to produce olefin oxide as one product and a residual liquor as another and in which the chlorination reaction and the dehydrochlorination reaction are carried out in separate chlorination and dehydrochlorination zones.

2. The method as claimed in claim 1 in which the olefin is dissolved in the brine solution under pressure of .5 to 40 bars.

3. The method as claimed in claim 1 in which the olefin is dissolved in the brine solution under pressure of 1.5 to 10 bars.

4. The method as claimed in claim 1 in which the aqueous solution in which the olefin is dissolved contains 8–30% by weight of the alkali metal chloride.

5. The method as claimed in claim 1 in which the aqueous solution in which the olefin is dissolved contains 12–25% by weight of the alkali metal chloride.

6. The method as claimed in claim 1 in which the chlorine is brought into contact with the solution of the olefin in stoichiometric amounts.

7. The method as claimed in claim 1 in which the chlorine is brought into contact with the solution of the olefin in an amount within the range of stoichiometric ratio to 5% less than the stoichiometric ratio.

8. The method as claimed in claim 1 in which the solution, during the reaction of the olefin and chlorine to form the monochlorohydrin, is maintained at a pH of 4 to 6.

9. The method as claimed in claim 1 in which the concentration of monochlorohydrin formed in the alkali metal chloride solution is maintained at a level below 1 mole per liter.

10. The method as claimed in claim 1 in which the reaction between the olefin and chlorine is carried out while the solution is at a temperature below 80° C.

11. The method as claimed in claim 1 in which the reaction between the olefin and chlorine is carried out while the solution is at a temperature within the range of 15–25° C.

12. The method as claimed in claim 1 in which the hydrogen chloride is split off from the monochlorohydrin by heating the solution containing the monochlorohydrin to boiling point temperature.

13. The method as claimed in claim 1 in which the salt solution containing the monochlorohydrin is treated with an aqueous solution of a base to adjust the pH to between 8 and 9 before splitting off the hydrogen chloride.

14. The method as claimed in claim 1 in which the base of the aqueous solution is selected from the group consisting of sodium hydroxide and potassium hydroxide.

15. The method as claimed in claim 1 in which the process is carried out in combination with the electrolysis of an alkali metal chloride solution in which the alkali metal chloride is the same as that in the solution in which the olefin is dissolved and in which the chlorine introduced into the solution containing the dissolved olefin is derived from the anode of the electrolytic cell.

16. The method as claimed in claim 15 in which the liquor in which the olefin is dissolved is derived from the cathode compartment of the electrolytic cell.

17. The method as claimed in claim 15 in which the alkali metal chloride in the electrolyte is present in an amount within the range of 15–25% by weight.

18. The method as claimed in claim 15 in which the alkali metal chloride in the electrolyte is present in an amount within the range of 18–22% by weight.

19. The method as claimed in claim 15 which includes the step of adjusting the liquor available as a product from the removal of hydrogen chloride to a pH of 7 and cycling the liquor to the electrolytic cell.

References Cited

UNITED STATES PATENTS

| 1,589,359 | 6/1926 | Burdick | 260—348.6 |
| 1,792,668 | 2/1931 | Weber et al. | 260—348.6 |
| 3,288,692 | 11/1966 | Leduc | 204—80 |

FOREIGN PATENTS 556,038   9/1943   Great Britain.

JOHN H. MACK, Primary Examiner

D. R. JORDAN, Assistant Examiner

U.S. Cl. X.R.

204—78; 260—348.6